United States Patent
Gao et al.

(10) Patent No.: US 8,019,591 B2
(45) Date of Patent: Sep. 13, 2011

(54) RAPID AUTOMATIC USER TRAINING WITH SIMULATED BILINGUAL USER ACTIONS AND RESPONSES IN SPEECH-TO-SPEECH TRANSLATION

(75) Inventors: Yuqing Gao, Mount Kisco, NY (US); Liang Gu, Yorktown Heights, NY (US); Wei Zhang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 11/865,871

(22) Filed: Oct. 2, 2007

(65) Prior Publication Data

US 2009/0089066 A1    Apr. 2, 2009

(51) Int. Cl.
*G10L 15/00* (2006.01)
(52) U.S. Cl. ............ 704/8; 704/251; 454/157; 454/185
(58) Field of Classification Search .............. 704/8, 251; 454/157, 185
See application file for complete search history.

(56) References Cited

U.S. PATENT DOCUMENTS

| | | | |
|---|---|---|---|
| 6,438,524 B1 * | 8/2002 | Shi | 704/277 |
| 2003/0158722 A1 * | 8/2003 | Lord | 704/3 |
| 2004/0122677 A1 * | 6/2004 | Lee et al. | 704/277 |
| 2007/0192110 A1 * | 8/2007 | Mizutani et al. | 704/277 |
| 2008/0003551 A1 * | 1/2008 | Narayanan et al. | 434/157 |

* cited by examiner

*Primary Examiner* — Daniel D Abebe
(74) *Attorney, Agent, or Firm* — Tutunjian & Bitetto, P.C.; Anne V. Dougherty

(57) ABSTRACT

A system and method for automatic user training in speech-to-speech translation includes integrating an automatic user response system configured to be responsive to a plurality of training items and selecting a training item from the plurality of training items. For the selected training item, in response to an utterance in a first language, the utterance is translated into a second language, and a response to the utterance in the second language is generated. A simulated action corresponding with the response in accordance with a user speaking the second language is also generated. The response and simulated action are output as a learning exercise for learning operations of the automatic user response system.

20 Claims, 2 Drawing Sheets

RAPID AUTOMATIC USER TRAINING WITH SIMULATED BILINGUAL USER ACTIONS AND RESPONSES IN SPEECH-TO-SPEECH TRANSLATION

GOVERNMENT RIGHTS

This invention was made with Government support under Contract No. NBCH2030001 awarded by the Defense Advanced Research Projects Agency (DARPA). The Government has certain rights in this invention.

BACKGROUND

1. Technical Field

The present invention relates to translating speech from one language to another, and more particularly, to a system, apparatus and method for simulating user actions and responses for rapid automatic user training during the use of a speech-to-speech translation system.

2. Description of the Related Art

Modern speech-to-speech (S2S) translation systems attempt to enable communications between two people that do not share the same language. To recognize the speech in one language and transform the language into the speech of another language, advanced technologies such as automatic speech recognition, machine translation, text-to-speech synthesis and natural language processing are integrated within a user interface that facilitates the multilingual communication between two speakers. The resulting system as well as its user functions is usually so complicated that it is very difficult to employ the system. In addition, it is even more difficult to master the operational functions properly for beginner users without sufficient training.

Modern speech-to-speech recognition systems aim toward facilitating communications between people speaking different languages. To achieve this goal, a typical speech translation system (1) collects the speech signal from one speaker, (2) recognizes the speech in the source language, (3) translates the recognized messages into the target language, (4) synthesizes the speech sound of the translated sentence, and (5) plays it by way of a speaker. Steps (2), (3) and (4) are commonly realized by the techniques of automatic speech recognition (ASR), machine translation (MT) and text-to-speech synthesis (TTS), respectively.

One issue for the success of a speech-to-speech recognition system is whether a new user can be trained to operate the system as well as all the ASR, MT and TTS functions properly and how soon the user can be trained to do so. Current speech-to-speech translation systems often provide two types of user support: material based learning and human aided learning.

With the first type, a new user is provided a set of text-based user manuals and/or well-designed video materials in the hope that he/she can figure out how to use the system properly, at almost no cost. Since the training procedure is not interactive and there is no foreign speaker available, the resulting learning cycle is usually very lengthy, ineffective and frustrating. In the second type of user support, a new user is given lessons by multilingual instructors and has the opportunity to practice using the system with a bilingual speaker. The resulting learning cycle is usually significantly shorter than the former type of user support and much more effective, but at dramatically higher cost. More importantly, it is often very difficult for a new user to find a bilingual speaker to practice the system out of training classes.

Current user training methods are mostly via text-based user manuals or pre-recorded video materials, which are often not easy to understand or interactive. Moreover, the user training of a multilingual system needs multilingual speakers. To practice using these systems, two users are required. One speaks the native language such as English and the other speaks a foreign language such as Chinese.

In reality, foreign speakers are difficult to find and expensive when a user tries to learn using a new speech to speech (S2S) translation system. Alternatively, a monolingual user can use the system in his/her native language, which will greatly increase system learning time and significantly limit the functions that can be practiced. This results in reduced user satisfaction.

SUMMARY

A need exists for a multilingual interactive user interface that enables rapid automatic multilingual user training for a speech to speech (S2S) translation system when there are no foreign speakers available during a user training period.

A system and method for automatic user training in speech-to-speech translation includes integrating an automatic user response system configured to be responsive to a plurality of training items and selecting a training item from the plurality of training items. For the selected training item, in response to an utterance in a first language, the utterance is translated into a second language, and a response to the utterance in the second language is generated. A simulated action corresponding with the response in accordance with a user speaking the second language is also generated. The response and simulated action are output as a learning exercise for learning operations of the automatic user response system.

Another method for automatic user training in speech-to-speech translation includes collecting dialogues and actions for speech translation applications, training models and establishing rules for automatic generation of multilingual responses; and training models and establishing rules for automatic generation of user actions. An automatic user response system is integrated and configured to be responsive to a plurality of training items. A training item is selected from the plurality of training items such that for the selected training item: in response to an utterance in a first language, translating the utterance into a second language; generating a response to the utterance in the second language; generating a simulated action corresponding with the response in accordance with a model for a user speaking the second language; and outputting the response and simulated action as a learning exercise for learning operations of the automatic user response system.

The method may be implemented using a computer readable medium comprising a computer readable program, wherein the computer readable program when executed on a computer causes the computer to perform the methods.

A translation system includes a memory configured to store one or more training models and rules, the training models and rules configured for automatic generation of multilingual responses and for automatic generation of user actions. An automatic speech recognition engine and machine translation module are configured to translate an utterance in a first language into a second language. An automatic user response system is configured to employ the training models and rules to generate a response to the utterance in the second language and generate a simulated action corresponding with the response in accordance with a user speaking the second language. An output device is configured to output the response and simulated action as a learning exercise for learning operations of the automatic user response system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
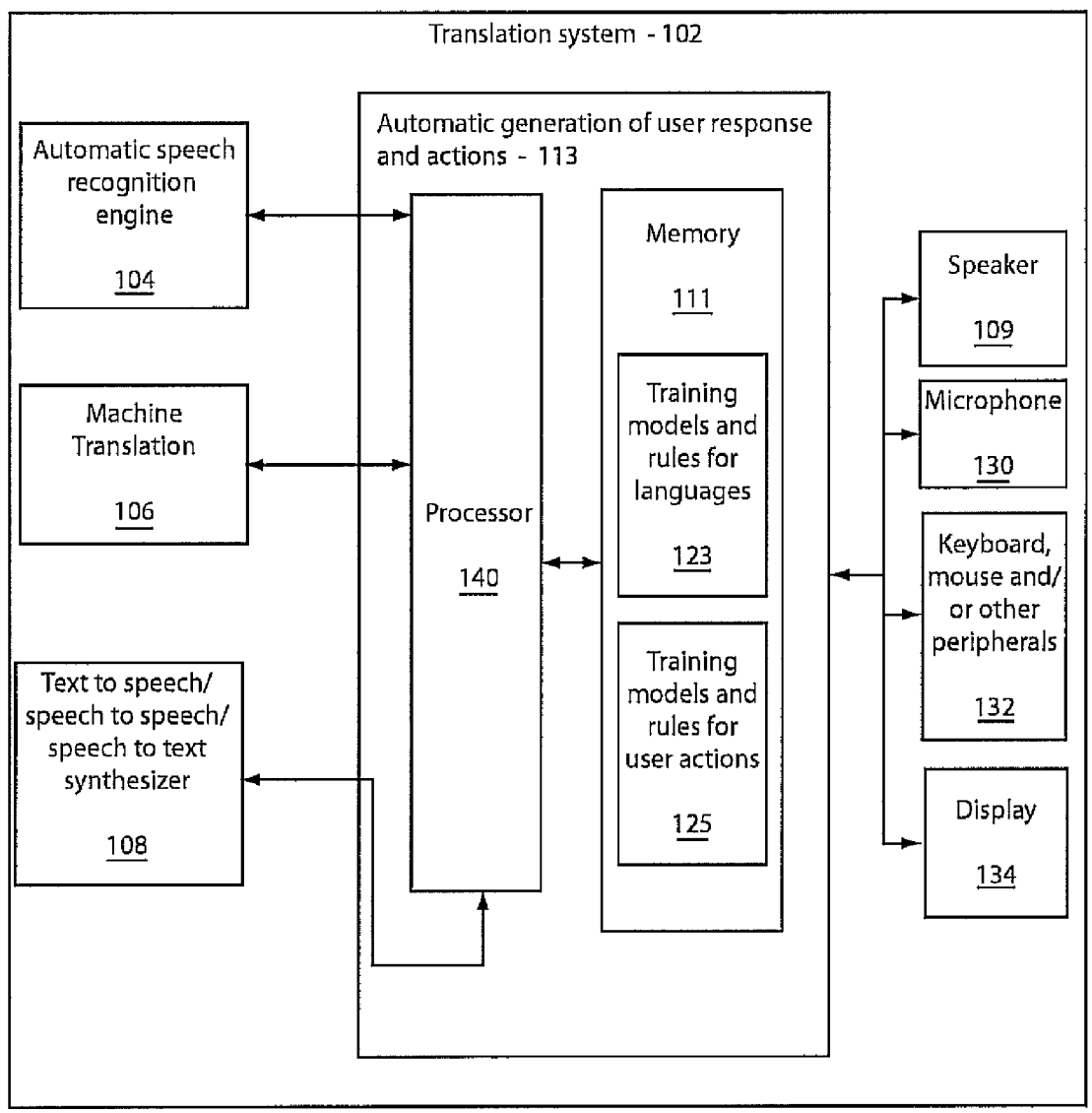
FIG. 1 is a block/flow diagram illustrating a system/method for an interactive user interface that provides rapid automatic user training by automatically generating multilingual user responses and actions in speech-to-speech translation, in accordance with one embodiment.

The present embodiments address the shortcomings of the prior art and provide additional advantages by simulating multilingual responses. This enables rapid automatic multilingual user training. In particular, one way of achieving rapid automatic bilingual user training is by providing simulated bilingual user actions and responses in a speech-to-speech translation system. When a native user uses a speech to speech (S2S) system, the system will simulate the actions and responses of a foreign user according to the actions and speech utterances initialized by a native user. In this way, a user can learn to use the S2S system to communicate with a "virtual" foreign user. In addition, the above communication process may be monitored by the S2S system so that the user will be reminded or warned whenever he/she makes an operational mistake. As a result, the learning cycle of a S2S system can be greatly reduced even if there is no foreign speaker available.

In particularly useful embodiments, a method or set of methods are designed to simulate the actions and responses of a foreign speaker. These actions and responses are linked with the corresponding actions and utterances of a native user. A training set may be collected and used that includes these bilingual actions/responses in parallel. Simulation models can be trained and optimized based on such kind of training data.

Additionally, these parallel actions/responses can be predefined manually or based on a specific set of rules. When a native user operates the S2S system, actions and responses are generated in the foreign language based on pre-trained models or pre-defined sets/rules. These actions and responses may be further categorized into various clusters, and the user can select any one or more of the clusters according to the user's needs during the system training routine.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram illustrates a system/method with an interactive user interface that provides rapid automatic user training by automatically generating multilingual user responses and actions in speech-to-speech translation. A speech-to-speech translation system 100 may include a dedicated translator or may be incorporated into a cellular telephone, a personal digital assistant or any other computer device. System 100 includes a speech translation system 102 that collects the speech signal from one speaker and recognizes the speech in the source language using an automatic speech recognition (ASR) engine 104. A machine translation (MT) module 106 translates the recognized messages into the target language. System 100 synthesizes the speech sound of the translated sentence, and plays the speech by way of a speaker 109 using a text-to-speech synthesis (TTS) module 108. The TTS 108 may include the capability of text to speech, speech to speech and speech to text synthesis.

System 100 includes a memory 111 for recording both user actions and speech. Memory 111 also stores training models and rules 123 and 125 for the automatic generation of multilingual responses and the generation of user actions. An automatic multilingual user training function 113 in accordance with the present principles enables a new user to practice using the system with a "virtual" bilingual speaker and therefore obtain a similar experience to that of a training class. The virtual speaker is available at almost no cost and at any time and place.

A user can interact with system 102 by speaking into a microphone 130, or employing other peripheral devices 132, such as a keypad/board, a mouse, a touch-sensitive screen, etc. Responses and outputs may be by way of speaker(s) 109, a display 134, and/or peripherals 132 (e.g., a printer, etc.).

In particularly useful embodiments, the displayed actions are the actions that should be taken by a user to cause the desired functions. For example, if the user wishes to begin a translation session each action taken by the user is employed to predict a next action, and the system teaches the user how to proceed with the next action. In this way, the user can quickly learn how to operate the device and can interact with the device to learn a second language or to use the translator to converse with others in different languages.

A processor 140 may include or work with an operating system for controlling the operations of system 102. In particular, the automatic multilingual user training function 113 include the memory 111 and processor 140. Function 113 is configured to carry out the operations described in greater detail with reference to FIG. 2.

Figure 2:
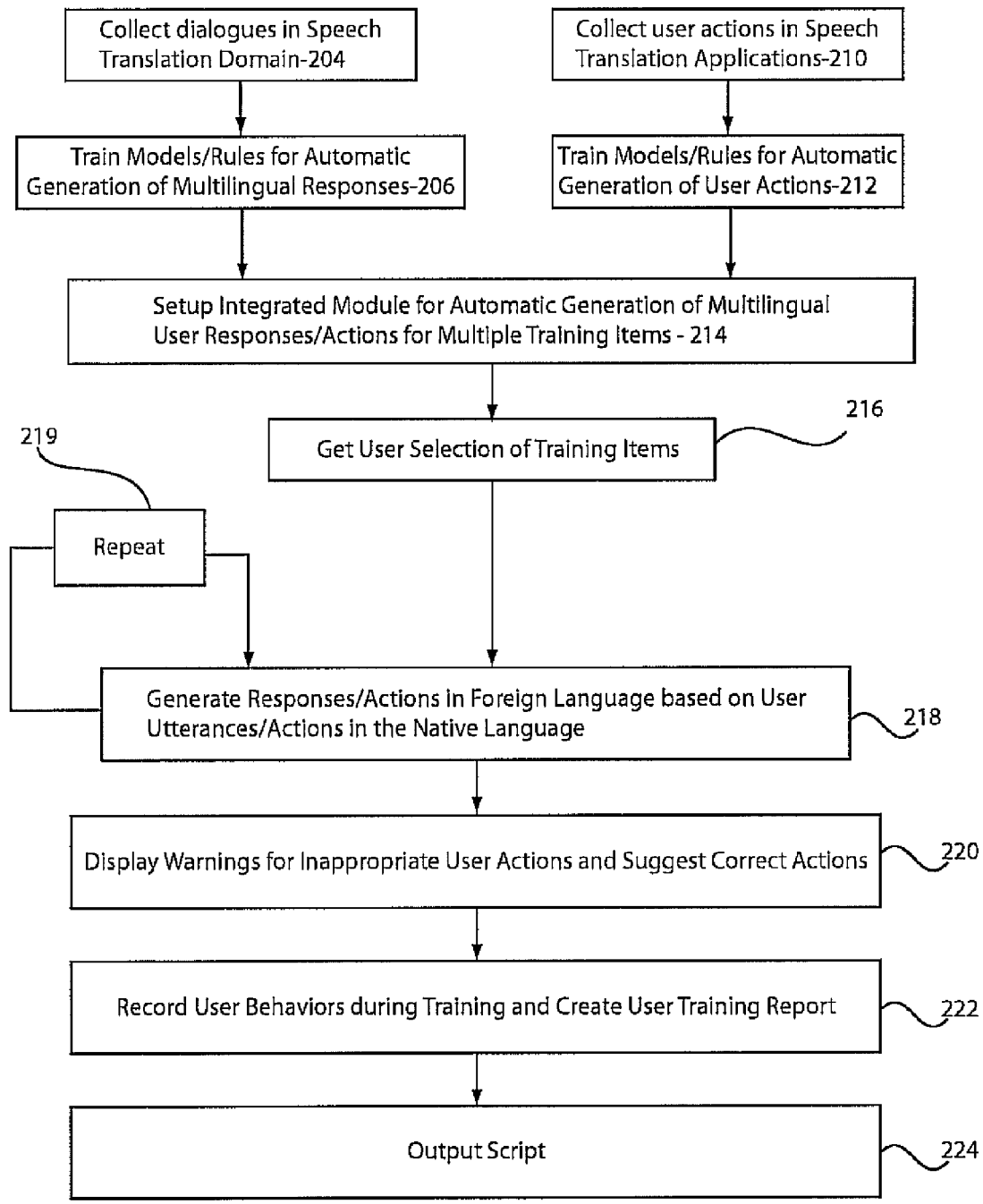
FIG. 2 is a block/flow diagram illustrating a system/method for a rapid automatic user training interface for automatically generating multilingual user responses and actions in a speech-to-speech translation system, in accordance with one embodiment.

Referring to FIG. 2, a block/flow diagram illustratively shows a system/method for training and interacting with the system 100 and in particular the automatic multilingual user training function 113. In block 204, collect all the possible user dialogues within the targeted speech-to-speech translation domain such as a traveling abroad dialogue, a medical emergency dialogue, etc. In block 206, using the data collected in block 204, train statistical models or design rules to enable automatic generation of multilingual responses within the targeted speech-to-speech translation domain. Rules can be system based, or user-defined. For any given utterance in the native language, one or multiple possible responses can be automatically generated in the foreign language to simulate the responses of a foreign speaker.

In block 210, collect all the possible user actions during the usage of the speech-to-speech translation system. The user actions may include keystrokes on a keypad, mouse events, microphone operation (e.g., on/off, filter levels, etc.), and any other action that may provide information.

Using the data collected in block 210, train statistical models or design rules to enable automatic generation of user actions of the speech-to-speech translation system in block 212. For any given user action by the native speaker such as click mouse-button, release mouse-button, etc., one or multiple possible responding actions can be automatically generated to simulate the responses of a foreign speaker.

Blocks 204, 206, 210 and 212 may be performed by a manufacturer or producer of the software models. In addition, the models can be updated through usage of the system.

The automatic responses learned in blocks 206 and 212 may be further categorized into multiple training items or categories in block 214. These items can be content based, such as for "get names", "get information", etc. They can also be component based, such as learning to use ASR, MT, TTS, etc. The automatic user training function 113 is integrated into the speech-to-speech translation system 100 (FIG. 1). The automatic user training function 113 can be used along with other speech translation functions at any time and at any place.

The automatic multilingual user training function 113 performs the following. In block 216, the user selects which training item or category to practice. For example, the user selects a training module that is prefabricated or user created. E.g., the user can select to practice how to "get names" from a foreign speaker or how to use the ASR function properly. In block 216, the user is asked to practice using the speech-to-speech translation system for the selected training item. If the training item is "get names", the user may turn on a microphone, say "what is your name" in English, turn off the microphone and let the system recognize the voice, translate it and play out the translated sentence in the foreign language.

According to the pre-trained models or rules, one or many responses are automatically generated in the foreign language in block 218. For example, a response to the inquiry may be "my name is Mary" played back in the foreign tongue. A corresponding translation may then be played back to the user in their native language also in block 218. A set of user actions is also generated including turn on microphone, turn off microphone, etc. The actions associated with the dialogue can be displayed or otherwise indicated to the user so that the user can learn the functions and operations of the device.

The multilingual interactive training process may be iterated in block 219 until the user feels satisfied with their skills to use the speech translation system properly or to speak the foreign language in accordance with the selected training item. All the practice procedures including actions performed and utterances pronounced may be logged and recorded in block 222 for later user behavior analysis. The user can use this information to learn the lessons and further improve their skills on the system. In addition, this information may be employed to create additional training items as designed by the user.

In block 220, the user training process may be monitored such that if any functions are improperly performed, such as, the user pressed the wrong button or the microphone button is operated too early or too late, the user will be warned and suggested to correct the operations. At the end of the training session, a report will automatically be generated recording all the user operations and suggested items for further improvement in block 222. The report may include the user's skill level, the number or errors, the user's language ability, etc.

For each training item, a pre-designed script may be provided in block 224 if the user does not know what to say. This script may be used as a good starting point for the user to get familiar with the speech-to-speech translation system, or to provide a basic rapport for a selected dialogue.

The following is an illustrative example dialogue with actions in accordance with one embodiment.

Native speaker: selects "greetings" dialogue

System: (in native tongue) do you want formal or informal greetings?

Native speaker: "Informal" (selected on display or spoken)

System: (in native tongue) "begin speaking"

Native speaker: (in native tongue) "Good morning, how are you?"

System: (in foreign tongue) "Good Morning!, I am fine". Screen pop-up indicates a menu:—Do you want to hear this response in your native tongue? or—Do you want to hear this response in the foreign tongue again?

Native Speaker: (selects "yes" for Do you want to hear this response in your native tongue?)

System: (in native tongue) "Good Morning!, I am fine". Screen pop-up indicates a menu:—Do you want to hear this response in your native tongue?—Do you want to hear this response in the foreign tongue again? or—Begin Speaking.

Native Speaker: (selects Begin Speaking) "Nice to meet you.". . .

The process continues or may be terminated at any time. In another example, the user may select "Learn to use the automatic speech recognition system". In this session the user interacts with the translation device to learn how to recognize speech and to use the functions of the ASR.

Having described preferred embodiments of a system and method for rapid automatic user training with simulated bilingual user actions and responses in speech-to-speech translation (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims.

Having thus described aspects of the invention, with the details and particularity required by the patent laws, what is claimed and desired protected by Letters Patent is set forth in the appended claims.

What is claimed is:

1. A method for automatic user training in speech-to-speech translation, comprising:
    integrating an automatic user response system for training a user to operate a speech-to-speech translation system, wherein said automatic user response system is configured to be responsive to a plurality of training items;
    selecting a training item from the plurality of training items; for the selected training item:
    in response to an utterance in a first language, translating the utterance into a second language;
    generating a response to the utterance in the second language; and
    generating a simulated action corresponding with the response in accordance with a user speaking the second language where the response and simulated action are output as a learning exercise for learning operations of the speech-to-speech translation system.

2. The method as recited in claim 1, further comprising training at least one of models and rules for generating multilingual responses to input speech.

3. The method as recited in claim 1, further comprising training at least one of models and rules for generating foreign user actions responsive to input speech or actions.

4. The method as recited in claim 1, further comprising warning a user of inappropriate user actions and suggesting corrective actions.

5. The method as recited in claim 1, further comprising recording user speech and actions during training to measure progress for learning the second language.

6. The method as recited in claim 1, further comprising providing a script in accordance with a translated dialogue to provide practice for a user.

7. The method as recited in claim 1, further comprising repeating the steps of: generating a response and generating a simulated action to promote learning.

8. A non-transitory computer readable storage medium comprising a computer readable program, wherein the computer readable program when executed on a computer causes the computer to perform the steps of:
    integrating an automatic user response system for training a user to operate a speech-to-speech translation system, wherein said automatic user response system is configured to be responsive to a plurality of training items;
    selecting a training item from the plurality of training items; for the selected training item:
    in response to an utterance in a first language, translating the utterance into a second language;
    generating a response to the utterance in the second language; and
    generating a simulated action corresponding with the response in accordance with a user speaking the second language where the response and simulated action are output as a learning exercise for learning operations of the speech-to-speech translation system.

9. A method for automatic user training in speech-to-speech translation, comprising:
    collecting dialogues and actions for speech translation applications;
    training models and establishing rules for automatic generation of multilingual responses;
    training models and establishing rules for automatic generation of user actions;
    integrating an automatic user response system for training a user to operate a speech-to-speech translation system, wherein said automatic user response system is configured to be responsive to a plurality of training items;
    selecting a training item from the plurality of training items such that for the selected training item: in response to an utterance in a first language, translating the utterance into a second language;
    generating a response to the utterance in the second language;
    generating a simulated action corresponding with the response in accordance with a model for a user speaking the second language; and
    outputting the response and simulated action as a learning exercise for learning operations of the speech-to-speech translation system.

10. The method as recited in claim 9, further comprising warning a user of inappropriate user actions and suggesting corrective actions.

11. The method as recited in claim 9, further comprising recording user speech and actions during training to measure progress for learning operations of the automatic user response system.

12. The method as recited in claim 9, wherein outputting the response and simulated action includes outputting a script in accordance with a translated dialogue.

13. The method as recited in claim 9, further comprising repeating the steps of: generating a response and generating a simulated action to promote learning.

14. A computer readable storage medium comprising a computer readable program, wherein the computer readable program when executed on a computer causes the computer to perform the steps of claim 9.

15. A translation system, comprising:
    a memory configured to store one or more training models and rules, the training models and rules configured for automatic generation of multilingual responses and for automatic generation of user actions;
    an automatic speech recognition engine and machine translation module configured to translate an utterance in a first language into a second language;
    an automatic user response system for training a user to operate a speech-to-speech translation system, wherein said automatic user response system is configured to employ the training models and rules to generate a response to the utterance in the second language and generate a simulated action corresponding with the response in accordance with a user speaking the second language; and
    an output device configured to output the response and simulated action as a learning exercise for learning operations of the speech-to-speech translation system.

16. The system as recited in claim 15, further comprising a warning device to alert a user of inappropriate user actions and to suggest corrective actions.

17. The system as recited in claim 15, wherein the memory is configured to record user speech and actions during training to measure learning progress.

18. The system as recited in claim 15, wherein the system outputs a script in accordance with a translated dialogue.

19. The system as recited in claim 15, wherein the automatic user response system is configured to repeat at least one of a response and a simulated action to promote learning.

20. The system as recited in claim 15, further comprising a text to speech synthesizer configured to output speech.

* * * * *